(12) United States Patent
Stoll

(10) Patent No.: US 10,847,766 B2
(45) Date of Patent: Nov. 24, 2020

(54) DEVICE FOR LOCKING A RECHARGEABLE BATTERY PACK

(71) Applicant: Metabowerke GmbH, Nuertingen (DE)

(72) Inventor: Michael Stoll, Wendlingen (DE)

(73) Assignee: Metabowerke GmbH, Nuertingen (DE)

( * ) Notice: Subject to any disclaimer, the term of this patent is extended or adjusted under 35 U.S.C. 154(b) by 0 days.

(21) Appl. No.: 16/213,067

(22) Filed: Dec. 7, 2018

(65) Prior Publication Data

US 2019/0181401 A1    Jun. 13, 2019

(30) Foreign Application Priority Data

Dec. 12, 2017    (DE) .......................... 10 2017 129 619

(51) Int. Cl.
*H01M 2/10*  (2006.01)
*B25F 5/02*  (2006.01)

(52) U.S. Cl.
CPC ............ *H01M 2/1022* (2013.01); *B25F 5/02* (2013.01)

(58) Field of Classification Search
CPC .......... B25F 5/02; B25F 5/00; H01M 2/1022; H01M 2220/30; H02J 7/0044
See application file for complete search history.

(56) References Cited

U.S. PATENT DOCUMENTS

| | | | | |
|---|---|---|---|---|
| 4,072,800 A * | 2/1978 | Gammer | .................. | A61F 2/72 429/97 |
| 5,368,954 A * | 11/1994 | Bruns | ...................... | B25F 5/02 429/123 |
| 6,729,413 B2 * | 5/2004 | Turner | ................ | H01M 2/1022 173/217 |
| 7,052,799 B2 * | 5/2006 | Zatezalo | ................. | G06F 1/163 292/170 |
| 7,413,460 B2 * | 8/2008 | Matthias | ................... | B25F 5/02 173/217 |
| 7,455,544 B2 * | 11/2008 | Glauning | ................. | B25F 5/02 173/217 |
| 7,554,287 B2 * | 6/2009 | Duesselberg | ............ | B25F 5/02 320/107 |
| 7,648,383 B2 | 1/2010 | Matthias et al. | | |

(Continued)

FOREIGN PATENT DOCUMENTS

DE    102005050781 A1    4/2007
DE    102014217992 A1    3/2016

(Continued)

OTHER PUBLICATIONS

Office Action from German Patent and Trademark Office dated Aug. 1, 2018 identifying the four identified prior art documents (identified above herein).

*Primary Examiner* — Edwin A. Leon
*Assistant Examiner* — Matthew T Dzierzynski
(74) *Attorney, Agent, or Firm* — Randall Danskin P.S.

(57) ABSTRACT

A device for locking a rechargeable battery pack on a housing of a hand-held power tool, having a contact plate, which is connectable to the housing and comprises at least one contact, for producing a contact between the rechargeable battery pack and the hand-held power tool and having a locking device, which engages in at least one recess in the rechargeable battery pack. The locking device is mounted on the contact plate so as to be rotatable and the locking device is supported on the contact plate by means of at least one spring element.

7 Claims, 3 Drawing Sheets

(56) References Cited

U.S. PATENT DOCUMENTS

| | | | | |
|---|---|---|---|---|
| 7,670,714 B2* | 3/2010 | Matthias | ............ | H01M 2/1022 |
| | | | | 173/217 |
| 7,701,172 B2* | 4/2010 | Watson | ............ | B25F 5/02 |
| | | | | 320/107 |
| 7,858,219 B2* | 12/2010 | Agehara | ............ | B25F 5/02 |
| | | | | 173/13 |
| 10,158,105 B2* | 12/2018 | Jenkins | ............ | B25F 5/02 |
| 2008/0211327 A1* | 9/2008 | Schlegel | ............ | B25F 5/02 |
| | | | | 310/50 |
| 2012/0251229 A1* | 10/2012 | Liang | ............ | B25F 5/02 |
| | | | | 403/325 |
| 2015/0165614 A1* | 6/2015 | Frenken | ............ | B23Q 17/007 |
| | | | | 173/2 |
| 2017/0312903 A1* | 11/2017 | Thanner | ............ | B25F 5/02 |
| 2018/0243895 A1* | 8/2018 | Frenken | ............ | B23Q 17/007 |

FOREIGN PATENT DOCUMENTS

| | | |
|---|---|---|
| EP | 2875910 A1 | 5/2015 |
| WO | 2016083555 A1 | 6/2016 |

* cited by examiner

DEVICE FOR LOCKING A RECHARGEABLE BATTERY PACK

The invention relates to a device for locking a rechargeable battery pack on a housing of a hand-held power tool, having a contact plate for producing a contact between the rechargeable battery pack and the hand-held power tool and having a locking device which engages in at least one recess in the rechargeable battery pack. In addition, the invention relates to a hand-held power tool having a housing and a rechargeable battery pack.

Such devices and corresponding hand-held power tools are disclosed in the general prior art. The locking devices are mostly mounted in the housing, which makes the mounting thereof considerably more difficult.

DE 10 2005 050 781 A1 describes a device for locking a rechargeable battery pack on a power tool, where a locking device is mounted at a foot end of a gripping part of the power tool. The locking device comprises a bar which is mounted on the foot end so as to be rotatable and on which a spring element acts in order to press a locking lug into a recess of the rechargeable battery pack.

EP 2 875 910 A1 describes a further device for locking a rechargeable battery pack on a power tool. In order to realize the locking, a tooth, which is acted upon with force by a spiral spring, engages in a recess of the housing of the rechargeable battery pack.

DE 10 2014 217 992 A1 discloses a further rechargeable battery pack for a hand-held power tool where locking elements are situated on the rechargeable battery pack itself.

Finally, WO 2016/083555 A1 discloses a further locking device for a rechargeable battery pack on a hand-held power tool.

It is the object of the present invention to create a device for locking a rechargeable battery pack on a housing of a hand-held power tool which is simple to mount.

Said object is achieved according to the invention by features named in Claim 1.

The rotatable bearing arrangement according to the invention of the locking device on the contact plate, which comprises at least one contact, enables considerably simpler assembly than up to now as, when assembling the hand-held power tool, it is not necessary to mount individual components. Rather, the contact plate can be mounted together with the locking device in the housing of the hand-held power tool, in particular as a pre-assembled unit.

It is particularly advantageous in this connection for the locking device to be supported on the contact plate by means of the at least one spring element, as in this way all the components used for locking the rechargeable battery pack in relation to the housing are accommodated in the contact plate and the assembly of the hand-held power tool is simplified even further as a result.

A further advantage of the solution according to the invention consists in the compactness of the same, as a result of which there is sufficient installation space present on the contact plate in order to be able to integrate all the electronics in the housing of the hand-held power tool. As a result, the contacts of the contact plate can directly use the electronics used for the operation of the hand-held power tool and there is no need for electric lines between the contacts of the rechargeable battery pack and a separate electronic unit, which would otherwise be used.

In a very advantageous further development of the invention, it can be provided that the locking device comprises a spindle and two locking elements which are attached on both ends of the spindle. This results in a very functional realization of the locking device, which can be mounted so as to be rotatable about the spindle and which, on account of the two locking elements, ensures reliable locking of the rechargeable battery pack on the housing.

If, in a further advantageous design of the invention, the contact plate comprises an elongated recess in which the spindle of the locking device is rotatably mounted, the locking device can be received very simply in the contact plate and mounted in a particularly simple manner. In addition, in this way the locking device is accommodated in a reliable manner in the contact plate and a simple design of the rotatable bearing arrangement of the same is ensured.

A very reliable method of operation of the device according to the invention is produced when the two locking elements are supported on the contact plate by means of respective spring elements.

In addition, it can be provided that the two locking elements each comprise a pin which engages in the respective spring element. In this way, it is ensured that in every state of the locking device, the locking elements are connected reliably to the spring elements, by means of which they are supported on the contact plate.

A further advantageous design of the invention can consist in that the spindle is realized from a metal material and the two locking elements are realized from a plastic material. In this way, the long-term durability of the locking device is increased and, in addition, simple producibility of the same is provided In order to increase the functionality of a hand-held power tool which is provided with the device according to the invention, it can be provided, in addition, that at least one spacer is arranged on the contact plate to generate a distance between at least one of the locking elements and the contact plate. This prevents any dust, which occurs when working with a hand-held power tool which is provided with a device according to the invention, from settling in the region between the locking device and the contact plate, as said dust is able to drop down through the gap generated by means of the at least one spacer.

Simple integration of the rechargeable battery pack in the housing and simple and reliable assembly of the same is produced when the rechargeable battery pack and/or the housing comprises guide elements for guiding the rechargeable battery pack in the housing.

When, in addition, an unlocking element, which acts on the locking device, is movably mounted in the housing, simple unlocking of the locking device and consequently simple releasing of the rechargeable battery pack from the housing is possible.

A hand-held power tool having a housing, having a rechargeable battery pack which is attachable on the housing and having a device according to the invention for locking the rechargeable battery pack on the housing.

Such a hand-held power tool comprises all the above-named advantages which are produced by the use of the device according to the invention.

An exemplary embodiment is shown schematically below by way of the drawing, in which:

DETAILED WRITTEN DESCRIPTION

Figure 1:
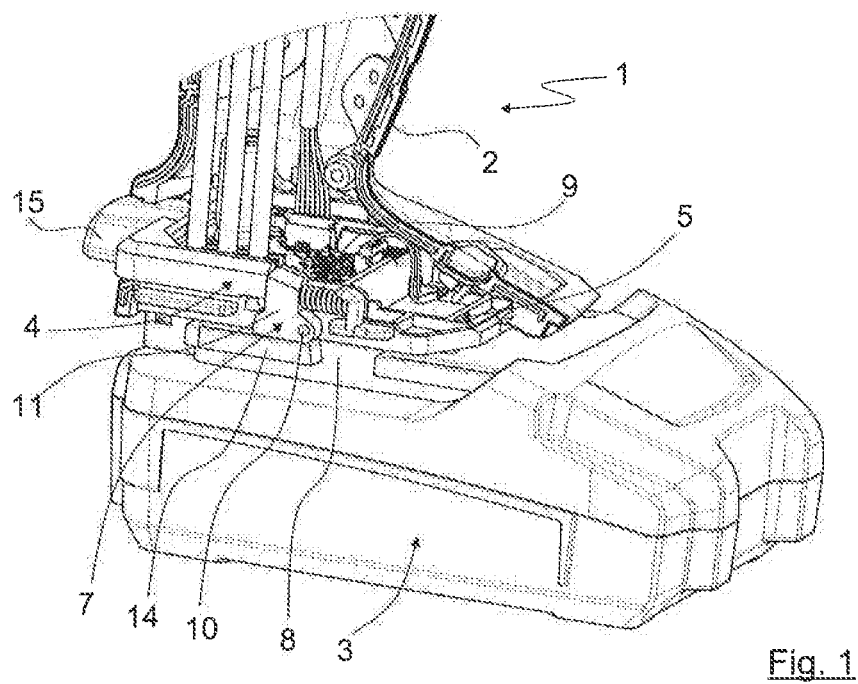
FIG. 1 shows a schematic representation of a first perspective view of a device according to the invention in a first state.

FIG. 1 shows part of a hand-held power tool 1, namely a housing 2 and a rechargeable battery pack 3 which is attached on the housing 2. The rechargeable battery pack 3 serves in a manner known per se for supplying power to the hand-held power tool 1. As the design and the method of operation of the rechargeable battery pack 3 are known per se, they will not be discussed in any more detail herein.

A device 4, which is described below, serves for locking the rechargeable battery pack 3 in relation to the housing 2. The device 4 comprises a contact plate 5 which serves, in principle, for the purpose of creating an electric contact between the rechargeable battery pack 3 and the hand-held power tool 1. To this end, the contact plate 5 generally comprises at least one contact 6, in the present case respective contacts 6 both on the top side and on the bottom side which can be seen in FIGS. 3 and 4. Since the method of electric contacting between the rechargeable battery pack 3 and the hand-held power tool 1 by means of the contact plate 5 and the contacts 6 thereof is also known per se, they will not be discussed in any more detail either herein.

Figure 4:
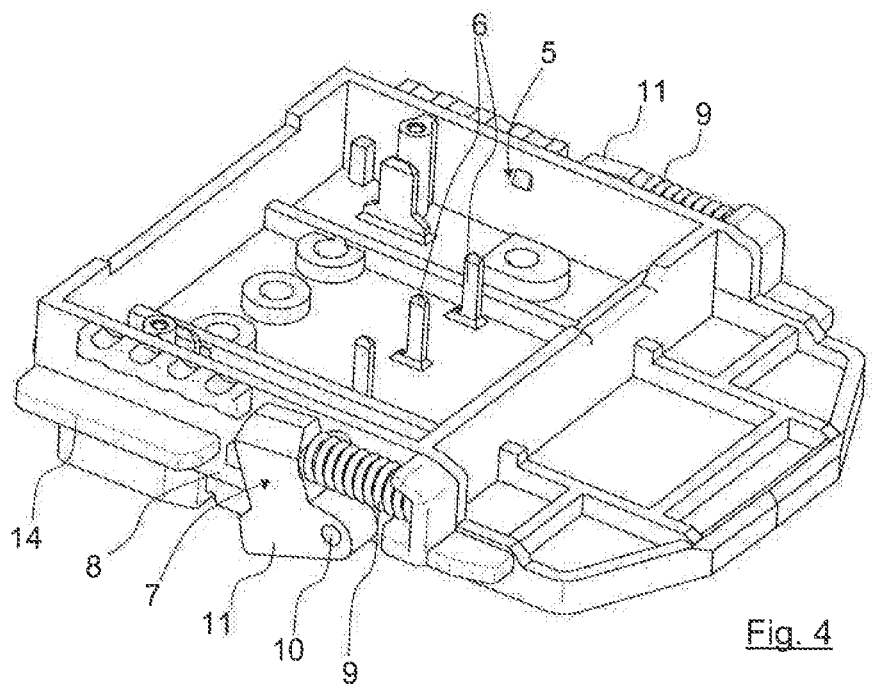
FIG. 4 shows a schematic representation of a perspective view of the contact plate of the device according to the invention.
Figure 6:
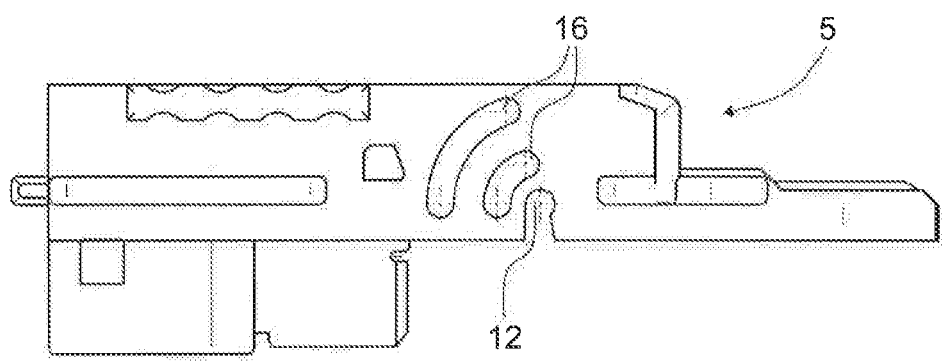
FIG. 6 shows a schematic representation of a side view of the contact plate of the device according to the invention.

As shown in FIGS. 4 and 6, the contact plate 5 is a separate component of the invention and is releasably attachable to both the hand-held power tool housing 2 and to the rechargeable battery pack 3. The releasably attachable contact plate 5 that has a top side and a bottom side and opposing lateral side portions, and each of the top side and the bottom side of the releasably attachable contact plate 5 have at least one electrical contact 6.

The device 4 comprises, in addition, a locking device 7 which is provided for the purpose of engaging in at least one recess 8 in the rechargeable battery pack 3 and consequently for producing a locking of the rechargeable battery pack 3 on the housing 2. In the state in FIG. 1, the locking device 7 is not situated in the recess 8, i.e. the rechargeable battery pack 3 is not locked to the housing 2 in this state, whereas in the state in FIG. 2, the locking device 7 engages in the recess 8 and consequently locks the rechargeable battery pack 3 on the housing 2.

The locking device 7 is mounted on the contact plate 5 so as to be rotatable and is supported on the contact plate 5 by means of at least one, in the present case by means of two, spring elements 9. The spring elements 9, in this case, are received in a recess in the contact plate 5. Whereas FIGS. 1, 2 and 3 each show only one of the spring elements 9, FIG. 4 shows the two spring element 9 on both sides of the contact plate 5.

Figure 5:
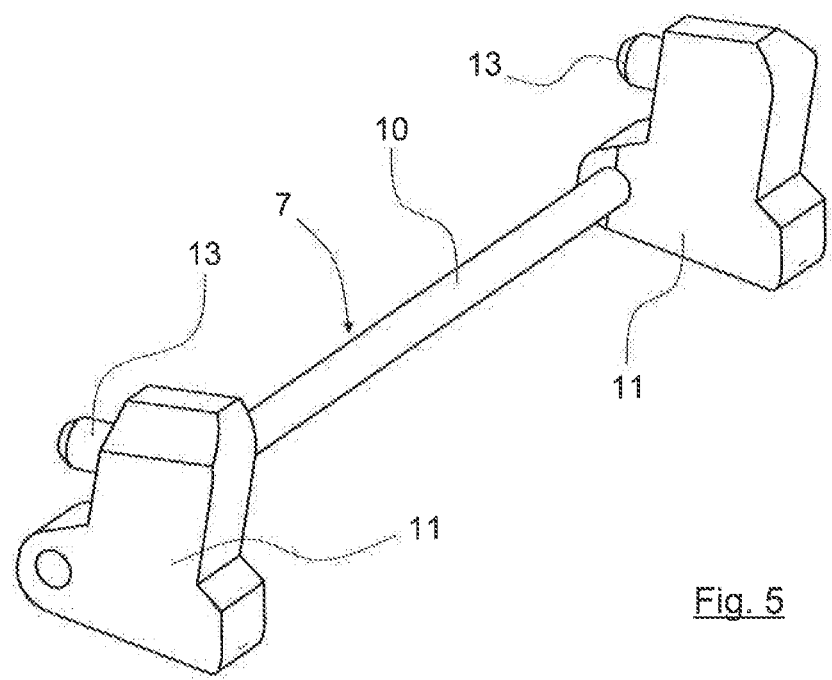
FIG. 5 shows a schematic representation of a perspective view of the locking device of the device according to the invention.

As can be seen from FIG. 5, the locking device 7 comprises a spindle 10 and two locking elements 11 which are attached on both ends of the spindle 10. For example, the spindle 10 can be realized from a metal material, such as, for example, steel, whereas the two locking elements 11 which are attached to the spindle 10 can be realized from a suitable plastic material. The connection between the locking elements 11 and the spindle 10 can be effected, for example, as a result of the locking elements 11 being injected onto the spindle 10. However, it is obviously also possible to glue the locking elements 11 to the spindle 10.

It can be seen, in particular from the side view of FIG. 6, that the contact plate 5 comprises an elongated recess 12 which extends over the entire width of the contact plate 5 and in which the spindle 10 of the locking device 7 is rotatably mounted. The recess 12 is realized with an undercut so that it is necessary to press the spindle 10 into the same with a certain force, the spindle 10, as a result, however, having a good hold in the recess 12.

Figure 3:
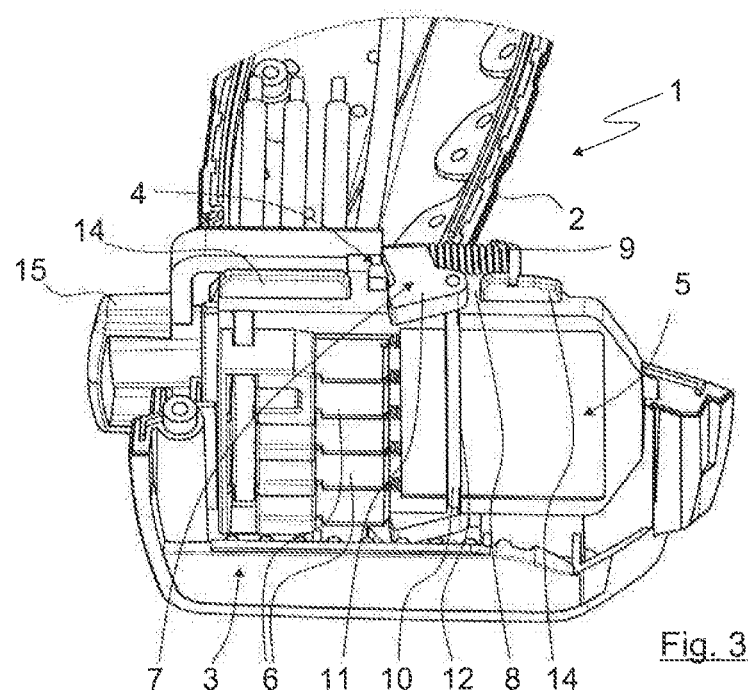
FIG. 3 shows a schematic representation of another view of the device according to the invention in the state of FIG. 2.

The manner of the arrangement of the spindle 10 in the recess 12 of the contact plate 5 can also be seen in FIG. 3. Furthermore, FIG. 3 shows that the spindle 10 of the locking device 7 shows the rotational axis thereof in the contact plate 5.

In order to ensure a reliable connection between the locking elements 11 and consequently the locking device 7, on the one hand, and the spring elements 9 on the other hand, the two locking elements 11 each comprise a pin 13 which engages in the respective spring element 9. The two pins 13 can be seen in FIG. 5 and it is very easy to deduce from FIG. 4 how the pins 13 engage in the spring elements 9. The spring elements 9 are held securely in this way by the pins 13. As a result, the spring elements 9 are able to exert a force onto the locking elements 11 without slipping off.

Figure 2:
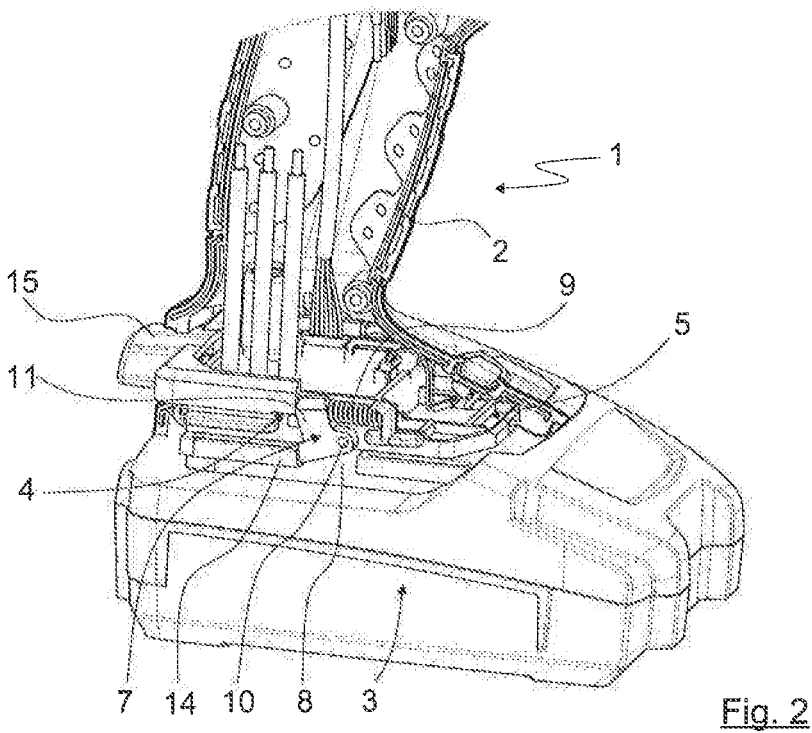
FIG. 2 shows a schematic representation of the device from FIG. 1 in a second state.

To mount the rechargeable battery pack 3 on the housing 2 of the hand-held power tool 1, the rechargeable battery pack 3 is simply pushed into the housing 2, to which end the rechargeable battery pack 3 and/or the housing 2 can comprise corresponding guide elements which are not designated in any more detail. In this case, the locking elements 11 slide, as can be seen in FIG. 1, along a shoulder 14, which is provided on both sides of the rechargeable battery pack 3, is able to form such a guide element and in which the recess 8 is situated. When the locking elements 11 reach the recess 8 in the shoulder 14, they are pressed into the recess 8 by the force of the spring elements 9 acting in the locking direction, as can be seen in FIG. 2. The rechargeable battery pack 3 is locked in relation to the housing 2 in this way For unlocking the rechargeable battery pack 3, an unlocking element 15 is provided, which acts on the locking device 7 and is displaceably mounted in the housing 2 and which, when it is pressed, presses the locking elements 11 out of the recess 8 against the force of the spring elements 9. Whereupon, the rechargeable battery pack 3 is able to be removed out of the housing 2. It is simply necessary to rotate the locking elements 11 approximately 20° C. about the spindle 10 for unlocking purposes. Said angle specification can obviously also be changed correspondingly in the case of different geometrical relationships between the housing 2 and the rechargeable battery pack 3.

FIG. 6 also shows two spacers 16, on which the locking elements 11 are supported and which ensure that a certain distance is created between the contact plate 5 and the locking elements 11. As a result of said distance or said gap, dust and similar, which is created when working with the hand-held power tool 1, is able to drop down thereby preventing the locking device 7 from being blocked by dust or similar.

I claim:

1. A locking device for releasably locking a rechargeable battery pack on a hand-held power tool, the hand-held power tool having a housing that internally contains electronics for operation of the hand-held power tool, the locking device comprising:

a releasably attachable contact plate that has a top side and a bottom side and opposing lateral side portions, and each of the top side and the bottom side of the releasably attachable contact plate have at least one electrical contact, and the at least one electrical contact on the top side of the releasably attachable contact plate electrically contacts the electronics within the housing of the hand-held power tool when the releasably attachable contact plate is attached to the housing of the hand-held power tool, and the at least one electrical contact on the bottom side of the releasably attachable contact plate electrically contacts an electrical contact of the rechargeable battery pack when the rechargeable battery back is releasably attached to the releasably attachable contact plate so as to provide electrical energy through the at least one electrical contact and to the hand-held power tool;

an elongated recess defined in the bottom side of the releasably attachable contact plate, and the elongated recess extends transversely between the opposing lateral side portions of the releasable attachable contact plate;

guide elements defined in the releasably attachable contact plate for releasably guiding the rechargeable battery pack into attachment/engagement with the releasably attachable contact plate and the guide elements defined in the releasably attachable contact plate are oriented generally perpendicularly to the elongated recess;

an elongate spindle axially rotatably carried within the elongated recess defined in the bottom side of the releasably attachable contact plate, the elongate spindle having a length and two opposing end portions, and each of the two opposing end portions of the elongate spindle fixedly carries a locking element, and each locking element has a protruding pin on its exterior surface;

two biasing spring elements, each biasing spring element communicating between a recess defined in the releasably attachable contact plate and the protruding pin on the exterior surface of the locking element carried by the elongate spindle, each biasing spring element rotatably biases the elongate spindle and both locking elements into engagement with locking recesses defined in the rechargeable battery pack to positionally secure the rechargeable battery pack into engagement with the guide elements defined in the releasably attachable contact plate; and an unlocking element carried by the housing and which communicates with the releasably attachable contact plate and the two rotatable locking elements, and when actuated, the unlocking element overcomes the biasing of the two biasing spring elements and responsively causes the elongate spindle to rotate axially within the elongate recess which responsively removes the two locking elements from the locking recesses defined in the rechargeable battery pack, and allows the rechargeable battery pack to move along the guide elements and be detached from the releasably attachable contact plate.

2. The locking device of claim 1 and wherein, each of the two locking elements carried by the elongate spindle have a protruding pin; and the protruding pin of each locking element engages with one of the two biasing spring elements.

3. The locking device of claim 1, and wherein the elongate spindle is formed of a metal material and each of the two locking elements are formed of a plastic material.

4. The locking device of claim 1, and further comprising:

a spacer on the releasably attachable contact plate to generate a distance between at least one of the two locking elements and the releasably attachable contact plate.

5. The locking device of claim 1 and further comprising:

guide elements defined in both the rechargeable battery pack and the releasably attachable contact plate for guiding the rechargeable battery pack into engagement with the releasably attachable contact plate.

6. The locking device of claim 1 and wherein pressing of the unlocking mechanism causes the locking elements to move in unison out of engagement with the locking recesses defined in the rechargeable battery back as the elongate spindle is axially rotated.

7. The locking device of claim 1 and where in the elongated recess defined in the bottom side of the contact plate has an undercut that rotationally positionally secures the elongate spindle within the elongated recess.

\* \* \* \* \*